(12) United States Patent
Heeke et al.

(10) Patent No.: US 10,423,839 B2
(45) Date of Patent: Sep. 24, 2019

(54) SYSTEM FOR MONITORING VEHICULAR TRAFFIC

(71) Applicants: Laser Technology, Inc., Centennial, CO (US); Kama-Tech (HK) Limited, Tsim Sha Tsui (CN)

(72) Inventors: Neil Thomas Heeke, Golden, CO (US); Philip John Lack, Melbourne (AU); Eric André Miller, Englewood, CO (US)

(73) Assignees: Laser Technology, Inc., Centennial, CO (US); Kama-Tech (HK) Limited, Hong Kong (CN)

( * ) Notice: Subject to any disclaimer, the term of this patent is extended or adjusted under 35 U.S.C. 154(b) by 299 days.

(21) Appl. No.: 15/353,531

(22) Filed: Nov. 16, 2016

(65) Prior Publication Data

US 2017/0147886 A1    May 25, 2017

Related U.S. Application Data

(60) Provisional application No. 62/260,110, filed on Nov. 25, 2015.

(51) Int. Cl.
   *G06K 9/00* (2006.01)
   *H04N 7/18* (2006.01)
   *H04N 5/225* (2006.01)

(52) U.S. Cl.
   CPC ....... *G06K 9/00785* (2013.01); *H04N 5/2252* (2013.01); *H04N 5/2256* (2013.01); *H04N 7/181* (2013.01)

(58) Field of Classification Search
   CPC .. G06K 9/00785; H04N 5/2252; H04N 7/181; H04N 5/2256
   See application file for complete search history.

(56) References Cited

U.S. PATENT DOCUMENTS

| | | | | |
|---|---|---|---|---|
| 5,568,406 | A * | 10/1996 | Gerber | B60R 13/10 116/63 R |
| 9,472,097 | B2 * | 10/2016 | Stelzig | G08G 1/0116 |
| 2005/0169500 | A1 * | 8/2005 | Takahashi | G06K 9/00785 382/104 |
| 2007/0290886 | A1 * | 12/2007 | Stam | B60Q 9/00 340/907 |
| 2012/0287278 | A1 * | 11/2012 | Danis | G08G 1/0175 348/148 |
| 2014/0112537 | A1 * | 4/2014 | Frank | H04N 5/33 382/103 |
| 2014/0355836 | A1 * | 12/2014 | Kozitsky | G06K 9/3258 382/105 |
| 2016/0163200 | A1 * | 6/2016 | He | G08G 1/22 701/117 |
| 2016/0171312 | A1 * | 6/2016 | Aoki | G08G 1/015 382/105 |
| 2016/0277714 | A1 * | 9/2016 | Teachout | H04N 7/181 |
| 2017/0003381 | A1 * | 1/2017 | Chung | G01S 7/4813 |
| 2017/0301220 | A1 * | 10/2017 | Jarrell | H04W 4/70 |

* cited by examiner

*Primary Examiner* — Howard D Brown, Jr.
(74) *Attorney, Agent, or Firm* — William J. Kubida; Hogan Lovells US LLP

(57) ABSTRACT

A vehicular traffic monitoring system which is capable of providing a complete monitoring system in an assembly capable of being mounted in a plane above or beside a roadway in order to monitor substantially all factors of interest with respect to approaching and receding vehicular traffic along the roadway below.

14 Claims, 4 Drawing Sheets

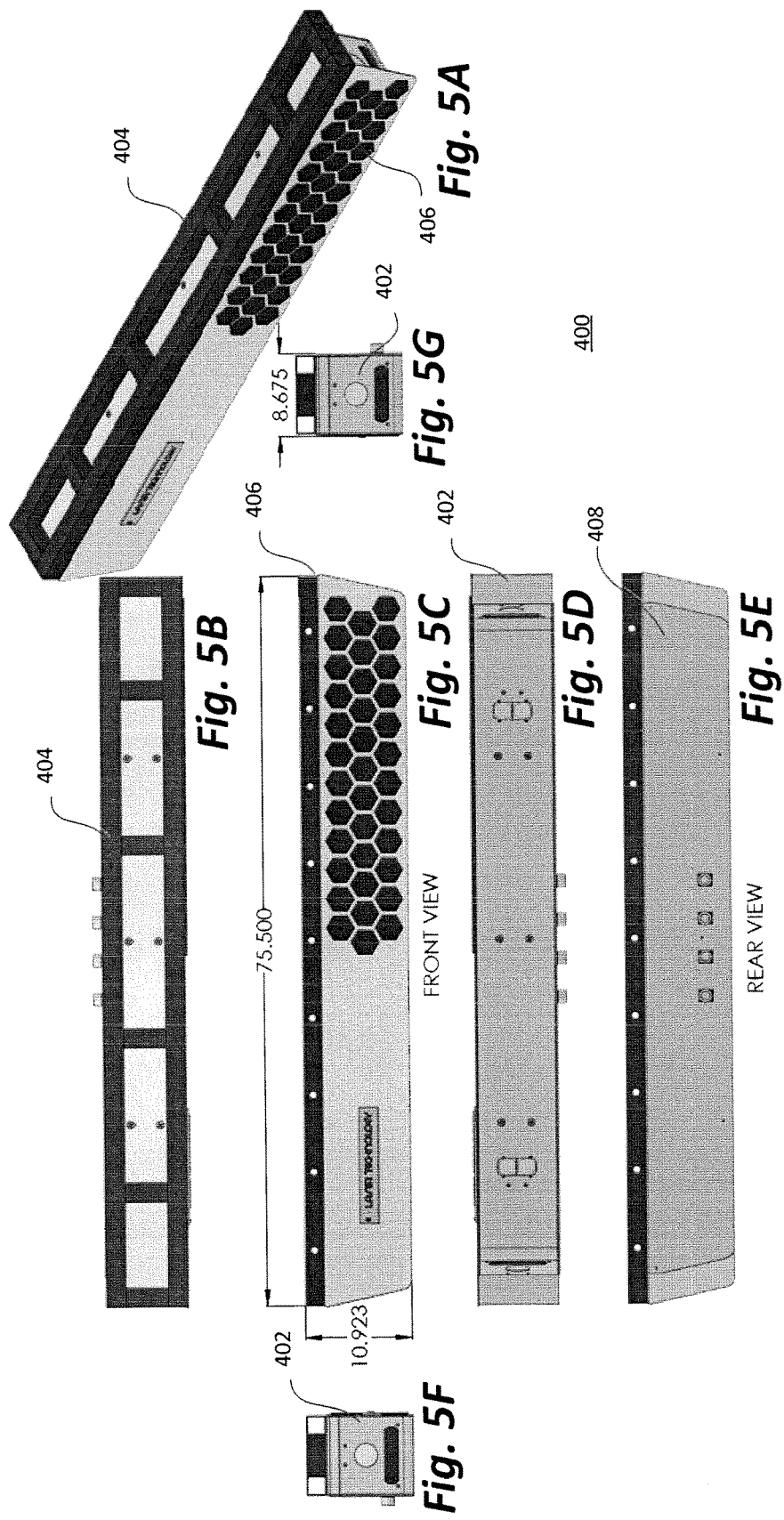

SYSTEM FOR MONITORING VEHICULAR TRAFFIC

CROSS REFERENCE TO RELATED PATENT APPLICATIONS

The present invention is related to, and claims priority from, U.S. Provisional Patent Application Ser. No. 62/260,110 filed Nov. 25, 2015, the disclosure of which is hereby incorporated herein by reference in its entirety.

BACKGROUND OF THE INVENTION

The present invention relates, in general, to the field of vehicular traffic monitoring systems. More particularly, the present invention relates to a vehicular traffic monitoring system which is capable of providing a complete monitoring system in an assembly capable of being mounted in a plane above a roadway in order to monitor substantially all factors of interest with respect to approaching and receding vehicular traffic along a roadway below.

SUMMARY OF THE INVENTION

Disclosed herein is a traffic measurement system incorporating three distinct areas of functionality, namely enforcement, traffic management and vehicles of interest. Among these areas are the enforcement of speeding, close following and over height violations, as well as others, by "look down" laser sensors which profile vehicles as they pass under the system. Traffic management information such as occupancy, flow, vehicle classification and speed, as well as other factors, may also be measured by the look down laser sensors.

Vehicles of interest are monitored by real-time Automatic License Plate Recognition (LPR or ALPR; also referred to as Automatic Number Plate Recognition [ANPR]) cameras, identifying stolen vehicles, outstanding tickets or warrants, or high interest vehicles related to recent crimes or terrorist activities, as well as other events. All of these measurement activities can be documented by multiple cameras, including scene cameras for both approaching and receding traffic, LPR cameras for both approaching and receding traffic and look down cameras to assist with laser sensor alignment. All of this functionality is incorporated into a single assembly which can be mounted in overhead locations (such as overpasses, bridges and/or cantilevered portions of roadway poles) or roadside installations.

The traffic monitoring system of the present invention can also be utilized to provide a calculated axle count of vehicles along a roadway based on classification information maintained, for example, in a table filled in by an end user. Moreover, the system may also operate in conjunction with a global positioning system (GPS) to provide coordinates along with the relevant date, time and other data strings.

Insofar as data management is concerned, the system of the present invention can also be implemented to provide data from the laser sensors, scene cameras and alignment cameras directly to the processors on the ANPR cameras. The ANPR cameras can provide data, along with the laser sensors and various cameras to the controller to be processed. The controller, in turn, can be programmed to provide a custom output string to be used by an external system.

Particularly disclosed herein is a traffic monitoring system for a roadway which comprises an enclosure having opposite, first approaching and second receding vehicle end portions thereof. First and second scene cameras are positioned adjacent the first and second end portions of the enclosure respectively and first and second ANPR cameras are further respectively associated with the first and second scene cameras. First and second laser sensors are respectively associated with the first and second scene and ANPR cameras and a controller is operatively coupled to the first and second scene and ANPR cameras and the first and second laser sensors.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIGS. 5A through 5G inclusive are various isometric, elevational and plan views of the vehicular traffic monitoring system assembly of the preceding figure.

DESCRIPTION OF A REPRESENTATIVE EMBODIMENT

Figure 1:
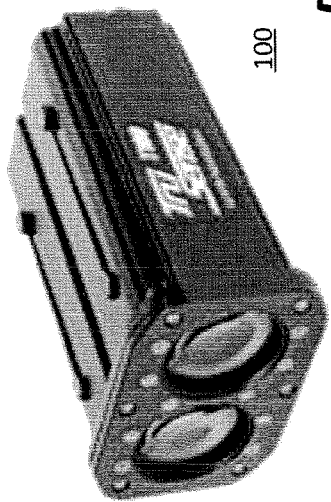
FIG. 1 is an illustration of a laser sensor for possible utilization in the vehicular traffic monitoring system of the present invention.

With reference now to FIG. 1, an illustration of a laser sensor 100 for possible utilization in the vehicular traffic monitoring system of the present invention is shown. As illustrated, the laser sensor 100 may conveniently comprise a TruSense® T-Series Traffic Sensor such as the T100/T200 available from Laser Technology, Inc., Centennial, Colo., assignee of the present invention.

Figure 2:
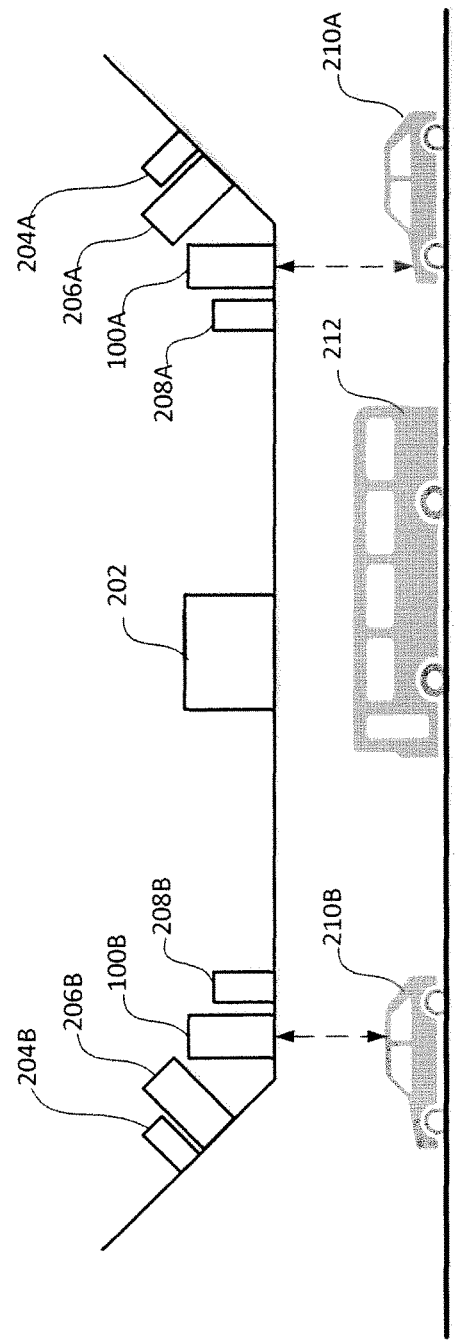
FIG. 2 is a simplified illustration of various elements of a representative embodiment of the vehicular traffic monitoring system of the present invention positioned in a plane above a roadway and aligned to monitor approaching and receding vehicular traffic.

With reference additionally now to FIG. 2, a simplified illustration of various elements of a representative embodiment of the vehicular traffic monitoring system 200 of the present invention is shown positioned in a plane above a roadway and aligned to monitor approaching and receding vehicular traffic.

The system 200 comprises, in pertinent part a central processing element such as controller 202 coupled to various sensors, cameras and illumination sources as will be disclosed more fully hereinafter. The representative embodiment of the system 200 specifically comprises approaching and receding vehicle scene cameras 204A and 204B respectively in addition to approaching and receding vehicle Automatic Number Plate Recognition (ANPR; alternatively referred to as Automatic License Plate Recognition [ALPR]) cameras and illumination sources 206A and 206B respectively. In addition, the system 200 as illustrated comprises approaching and receding vehicle laser sensors 100A and 100B which may respectively comprise TruSense® T100 and T200 units. Alignment cameras 208A and 208B are respectively associated with the corresponding laser sensor 100A and 100B to facilitate the alignment of these sensors to the roadway below along which the system 200 is aligned.

As also illustrated, the system 200 can be utilized to determine the speed of approaching and receding vehicles 210A and 210B as well as the classification, length and height of vehicles such as the case with the large vehicle 212. Further, one or more direct look-down cameras may also be incorporated into the system 200 (for example, the alignment cameras 208A, 208B) to provide a screen shot for possible use in establishing a tailgating infraction involving the vehicles 210A, 210B and 212 as they pass directly under the laser sensors 100A, 100B. The alignment cameras can also function to provide ongoing verification of the alignment of the laser sensors 100A, 100B which would serve to reduce the amount of time that a roadway might need to be closed for maintenance activities.

Figure 3:
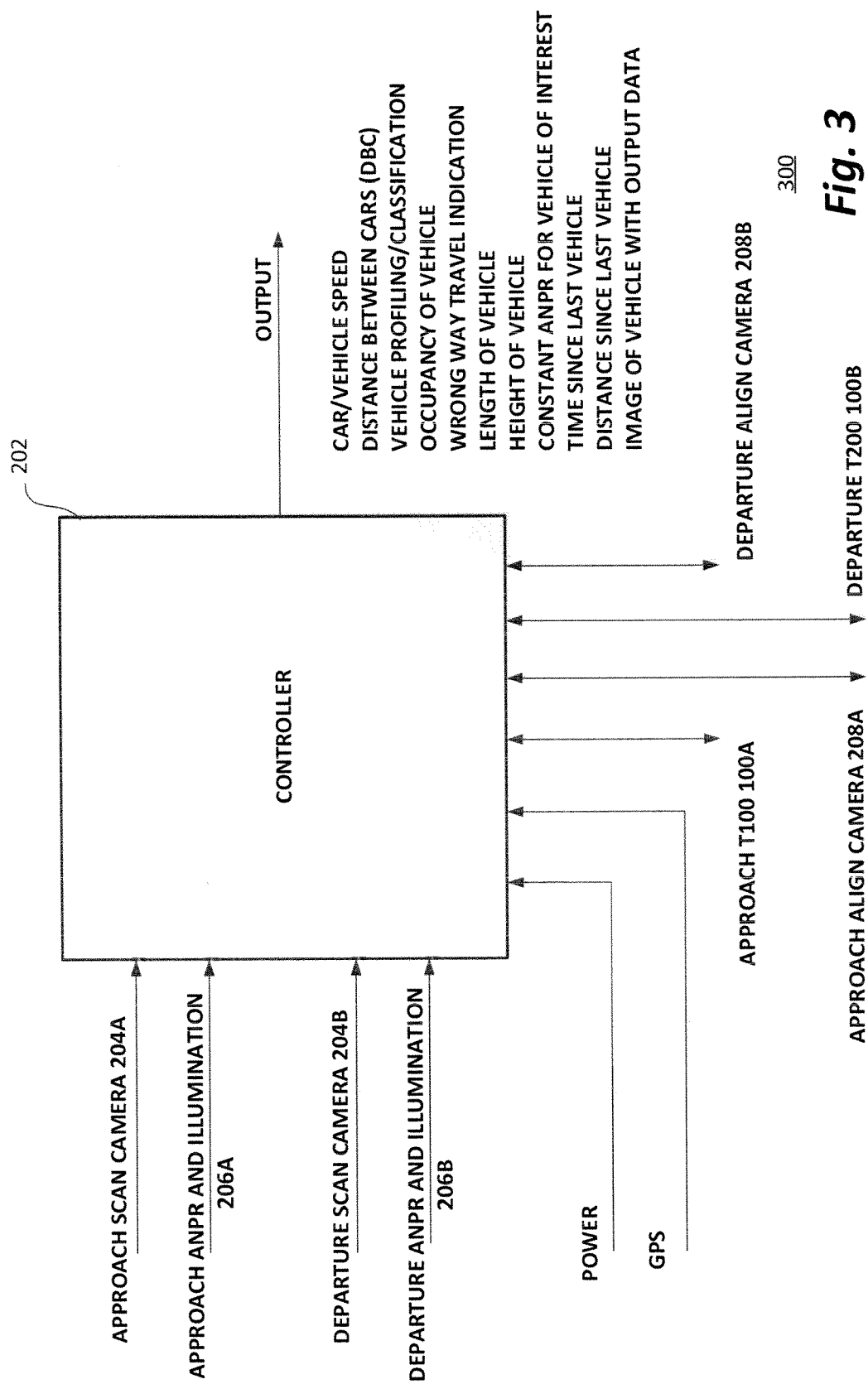
FIG. 3 is a simplified illustration of the inputs and outputs of the various elements of the vehicular traffic monitoring system of the preceding figure in conjunction with a processing element such as a controller.

With reference additionally now to FIG. 3, a simplified illustration of the inputs and outputs of the various elements of the vehicular traffic monitoring system 200 of the preceding figure is shown in conjunction with a processing element such as a controller, together comprising a system 300. The system 300 comprises controller 202 which receives as inputs data from the scene (or scan) cameras 204A/204B as well as the ANPR cameras and illumination sources 206A/206B. The controller 202 further interacts operationally with the laser sensors 100A/100B and the alignment cameras 208A/208B. Power is supplied to the controller 202 as well as the other associated sensors and devices as appropriate.

The system 300 is operational to provide output information with respect to the car or other vehicle speed, the distance between cars (DBC), vehicle profile and/or classification, the occupancy of a vehicle, an indication of a vehicle traveling the wrong way along a roadway, the length and/or height of a vehicle, a constant ANPR for a vehicle of particular interest, the elapsed time and distance since the last vehicle was detected as well as an image of a particular vehicle in conjunction with any or all of the preceding relevant data associated therewith.

Figure 4:
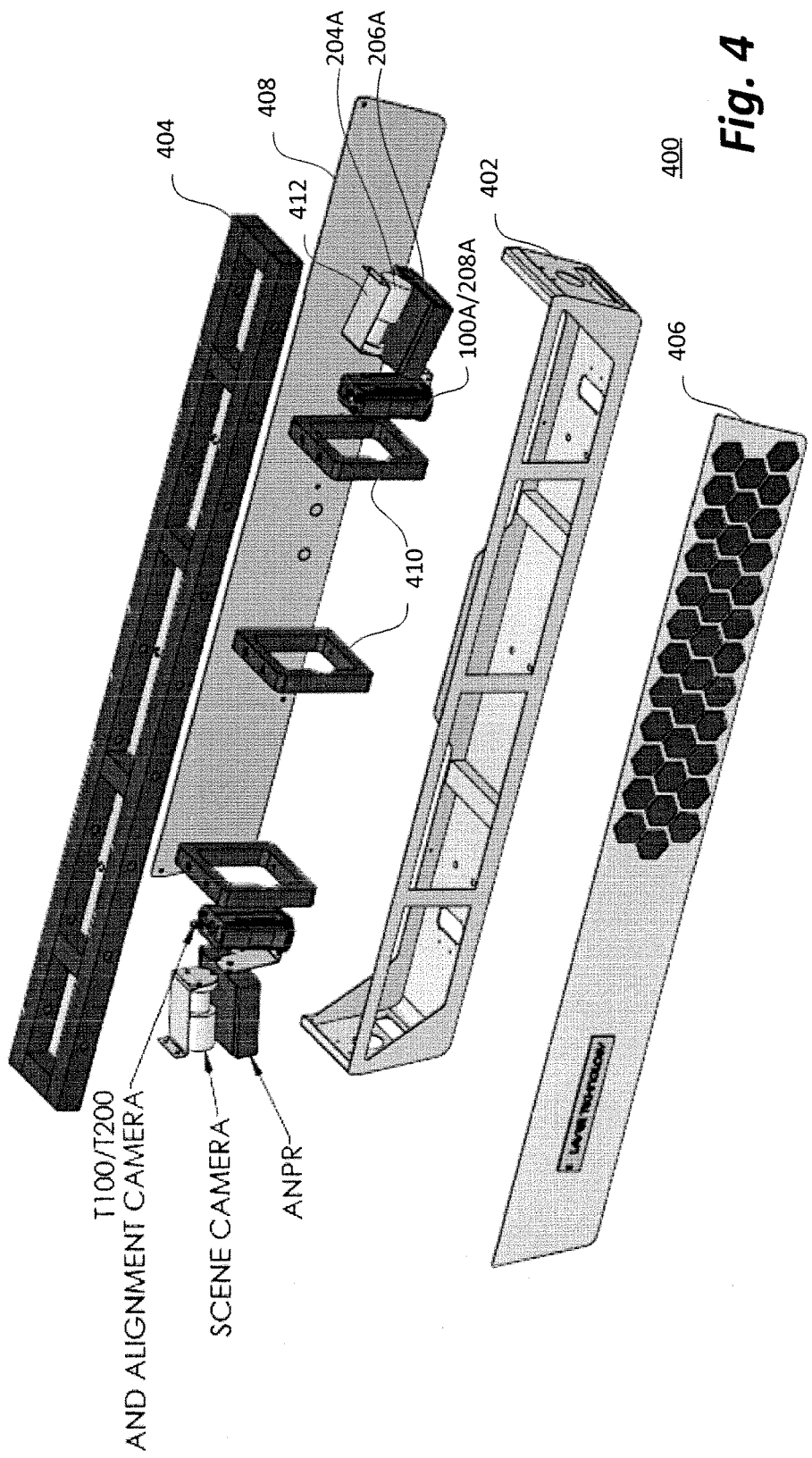
FIG. 4 is an isometric, exploded view of a representative embodiment of a vehicular traffic monitoring system assembly in accordance with the present invention and illustrating the structural and functional elements thereof.

With reference additionally now to FIG. 4, an isometric, exploded view of a representative embodiment of a vehicular traffic monitoring system assembly 400 in accordance with the present invention is shown and illustrative of the structural and functional elements thereof. The assembly 400 supports and retains the various elements previously illustrated and described with respect to the system 200 of FIG. 2 and is mounted in a plane above a roadway and aligned substantially longitudinally therewith such that approaching and receding vehicular traffic can be monitored.

The assembly 400 comprises a frame 402, top panel 404 and front and rear panels 406, 408 respectively, altogether defining an enclosure for the system 200. A number of supports 410 are interposed between the frame 402 and top, front and rear panels 404, 406 and 408. Brackets 412 support the scene cameras 204A/204B, ANPR camera and illumination sources 206A/206B, laser sensors 100A/100B and alignment cameras 208A/208B as shown in FIG. 4 and FIG. 2. In addition, the controller 202 (not shown) may also be physically positioned within the assembly 400.

With reference additionally now to FIGS. 5A through 5G inclusive, various isometric, elevational and plan views of the vehicular traffic monitoring system assembly 400 of the preceding figure are shown. In this regard, FIG. 5A is an isometric view of a fully assembled assembly 400 illustrating the top and front panels 404, 406 respectively. FIG. 5B is a top plan view of the assembly 400 illustrating the top panel particularly. FIG. 5C is a front elevational view of the assembly 400 illustrating the front panel 406. FIG. 5D is a bottom plan view of the assembly 400 illustrating the frame 402 while FIG. 5E is a rear elevational view of the rear panel 408. FIGS. 5F and 5G are respectively right and left views of the assembly 400 illustrating the end portions of the frame 402.

While there have been described above the principles of the present invention in conjunction with specific apparatus, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A traffic monitoring system for a roadway comprising:
   an enclosure having opposite first approaching and second receding vehicle end portions thereof;
   first and second scene cameras positioned adjacent said first and second end portions of said enclosure respectively;
   first and second automatic number plate recognition (ANPR) cameras respectively associated with said first and second scene cameras;
   first and second laser sensors respectively associated with said first and second scene and ANPR cameras; and
   a controller operatively coupled to said first and second scene and ANPR cameras and said first and second laser sensors.

2. The traffic monitoring system of claim 1 further comprising first and second illumination sources associated with said first and second scene cameras.

3. The traffic monitoring system of claim 1 further comprising first and second alignment cameras associated with said first and second laser sensors.

4. The traffic monitoring system of claim 1 wherein said system is positioned in a plane above said roadway.

5. The traffic monitoring system of claim 1 wherein said system is positioned at a roadside of said roadway.

6. The traffic monitoring system of claim 1 wherein said first and second laser sensors comprise TruSense® T100 and T200 units respectively.

7. The traffic monitoring system of claim 1 wherein said system is capable of operation to determine vehicle speed on said roadway utilizing at least one of said first and second laser sensors.

8. The traffic monitoring system of claim 1 wherein said system is capable of operation to determine the distance between vehicles on said roadway utilizing at least one of said first and second laser sensors.

9. The traffic monitoring system of claim 1 wherein said system is capable of operation to determine one of vehicle profile or classification utilizing at least one of said first and second laser sensors.

10. The traffic monitoring system of claim 1 wherein said system is capable of operation to determine the occupancy of a vehicle on said roadway utilizing at least one of said first and second scene cameras.

11. The traffic monitoring system of claim 1 wherein said system is capable of operation to determine one of length or height of a vehicle on said roadway utilizing at least one of said first and second laser sensors.

12. The traffic monitoring system of claim 1 wherein said system is capable of operation to determine one of time or distance since a preceding vehicle has been sensed by said system.

13. The traffic monitoring system of claim 1 wherein said system is capable of operation to provide an indication of a license plate of a vehicle of interest utilizing at least one of said first and second ANPR cameras.

14. The traffic monitoring system of claim 1 wherein said system is capable of operation to provide an indication of a vehicle traveling a wrong way on said roadway utilizing said first and second scene cameras.

\* \* \* \* \*